(12) United States Patent
Yoshida et al.

(10) Patent No.: US 12,505,818 B2
(45) Date of Patent: Dec. 23, 2025

(54) INFORMATION PROCESSING APPARATUS, INFORMATION PROCESSING METHOD, AND PROGRAM WITH FRAME RATE OPTIMIZATION

(71) Applicant: Sony Interactive Entertainment Inc., Tokyo (JP)

(72) Inventors: Koichi Yoshida, Tokyo (JP); Sachiyo Aoki, Tokyo (JP); Yasunari Hatasawa, Tokyo (JP); Takahiro Aizawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/832,555

(22) PCT Filed: Jan. 20, 2023

(86) PCT No.: PCT/JP2023/001692
§ 371 (c)(1),
(2) Date: Jul. 24, 2024

(87) PCT Pub. No.: WO2023/145642
PCT Pub. Date: Aug. 3, 2023

(65) Prior Publication Data
US 2025/0166589 A1 May 22, 2025

(30) Foreign Application Priority Data

Jan. 31, 2022 (JP) ................. 2022-013445

(51) Int. Cl.
*G09G 5/38* (2006.01)
*H04N 7/01* (2006.01)

(52) U.S. Cl.
CPC ............... *G09G 5/38* (2013.01); *H04N 7/013* (2013.01); *G09G 2340/0435* (2013.01)

(58) Field of Classification Search
CPC ....................................... G09G 5/38
See application file for complete search history.

(56) References Cited

U.S. PATENT DOCUMENTS 8,542,221 B1    9/2013  Wyatt et al.
2023/0004287 A1* 1/2023  Lin ........................ G06F 3/1454

FOREIGN PATENT DOCUMENTS

JP          2018-061674 A      4/2018

OTHER PUBLICATIONS

International Search Report and Written Opinion mailed on Mar. 20, 2023, received for PCT Application PCT/JP2023/001692, filed on Jan. 20, 2023, 08 pages including English Translation.

* cited by examiner

*Primary Examiner* — Gustavo Polo
(74) *Attorney, Agent, or Firm* — Fish & Richardson P.C.

(57) ABSTRACT

Provided is an information processing apparatus that draws a display frame image to be displayed on a display apparatus and transmits the drawn display frame image to the display apparatus in one of operation modes of a fixed frame rate and a variable frame rate. The information processing apparatus draws a display frame image and transmits the drawn display frame image to the display apparatus in the operation mode of a variable frame rate, and switches, in a case where a moving image including contents that are drawn already when the drawing of the display frame image is performed is to be displayed on the display apparatus, the operation mode to the operation mode of a fixed frame rate.

18 Claims, 4 Drawing Sheets

INFORMATION PROCESSING APPARATUS, INFORMATION PROCESSING METHOD, AND PROGRAM WITH FRAME RATE OPTIMIZATION

CROSS-REFERENCE TO RELATED APPLICATIONS

This application is a national stage application, pursuant to 35 U.S.C. § 371, of International Patent Application No. PCT/JP2023/001692, filed Jan. 20, 2023, which claims priority from Japanese Patent Application No. 2022-013445, filed Jan. 31, 2022, the entire contents of each are incorporated herein by reference.

TECHNICAL FIELD

The present invention relates to an information processing apparatus, an information processing method, and a program by which a video to be displayed on a screen of a display apparatus is generated.

BACKGROUND ART

Generally, a display apparatus such as a domestic television receiver displays a video by continuously updating a still image (frame image) to be displayed on a screen in a predetermined cycle (refresh rate). Therefore, it is necessary for an information processing apparatus, which generates a video to be displayed on a display apparatus, to draw frame images constituting the video at a fixed frame rate adjusted to the refresh rate. However, there is a problem that, if the frame rate is fixed, the drawing performance of the information processing apparatus cannot be taken advantage of sufficiently, or conversely, in a case where the drawing performance of the information processing apparatus is insufficient, a disorder of display such as stuttering or tearing occurs.

Therefore, in a video standard such as the HDMI (registered trademark), a technology called variable refresh rate (VRR) in which the refresh rate of a display apparatus is made variable has been proposed. With this technology, since the display apparatus can update a display image at any refresh rate, the information processing apparatus can draw frame images at a more desirable frame rate by dynamically changing the frame rate according to a drawing speed of the information processing apparatus itself or the like.

SUMMARY

Technical Problem

In the technology described above, the information processing apparatus updates a frame image at a frame rate that varies according to the drawing speed of the information processing apparatus itself or the like. However, in some cases, it is not appropriate to update a frame image at a variable frame rate in this manner.

The present invention has been made in view of such a situation as described above, and one of objects of the present invention resides in provision of an information processing apparatus, an information processing method, and a program by which a frame image constituting a video can be updated by an appropriate method depending on the situation.

Solution to Problem

An information processing apparatus according to an aspect of the present invention is an information processing apparatus that draws a display frame image to be displayed on a display apparatus and that transmits the drawn display frame image to the display apparatus in one of operation modes of a fixed frame rate and a variable frame rate, the apparatus including a frame image drawing section that draws the display frame image and transmits the drawn display frame image to the display apparatus in the operation mode of a variable frame rate, and an operation mode switching section that switches, in a case where a moving image including contents that are drawn already when the drawing of the display frame image is performed is to be displayed on the display apparatus, the operation mode of the frame image drawing section to the operation mode of a fixed frame rate.

An information processing method according to an aspect of the present invention is an information processing method for drawing a display frame image to be displayed on a display apparatus and transmitting the drawn display frame image to the display apparatus in one of operation modes of a fixed frame rate and a variable frame rate, the method including a frame image drawing step of drawing the display frame image and transmitting the drawn display frame image to the display apparatus in the operation mode of a variable frame rate, and an operation mode switching step of switching, in a case where a moving image including contents that are drawn already when the drawing of the display frame image is performed is to be displayed on the display apparatus, the operation mode so as to transmit the display frame image to the display apparatus at a fixed frame rate in the frame image drawing step.

A program according to an aspect of the present invention is a program for causing a computer that draws a display frame image to be displayed on a display apparatus and that transmits the drawn display frame image to the display apparatus in one of operation modes of a fixed frame rate and a variable frame rate, to execute a frame image drawing step of drawing the display frame image and transmitting the drawn display frame image to the display apparatus in the operation mode of a variable frame rate, and an operation mode switching step of switching, in a case where a moving image including contents that are drawn already when the drawing of the display frame image is performed is to be displayed on the display apparatus, the operation mode so as to transmit the display frame image to the display apparatus at a fixed frame rate in the frame image drawing step. This program may be provided in a state of being stored in a computer-readable non-transitory information storage medium.

DESCRIPTION OF EMBODIMENT

In the following, an embodiment of the present invention is described in detail with reference to the drawings.

Figure 1:
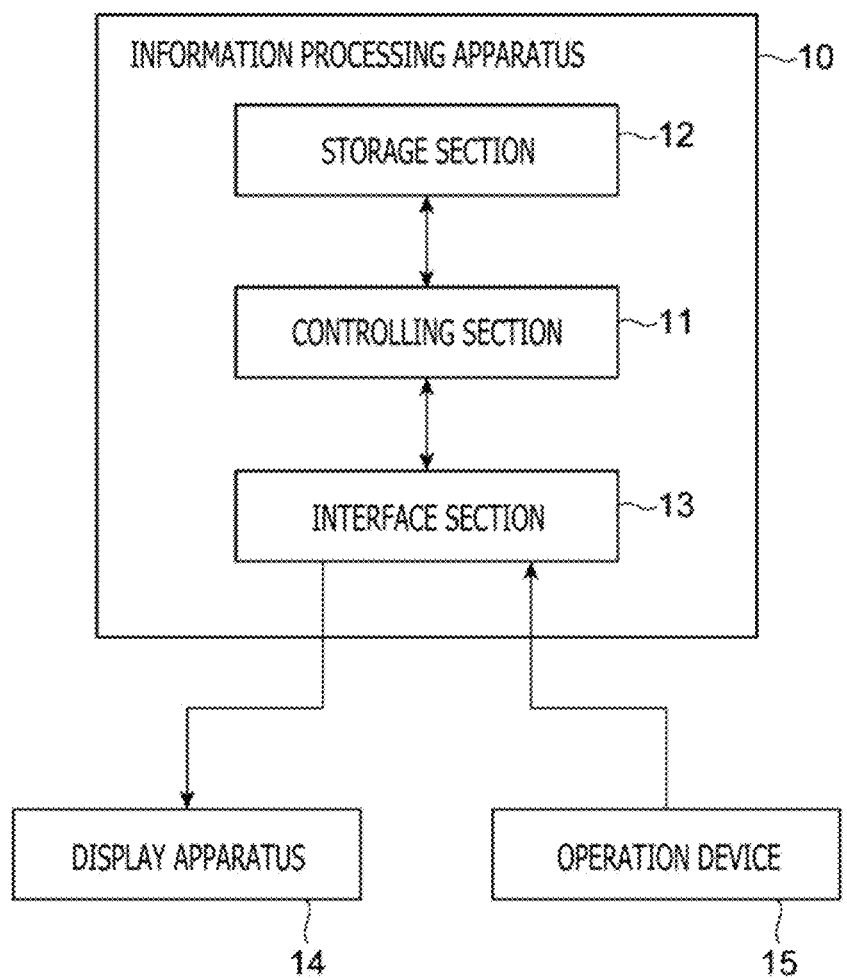
FIG. 1 is a configuration block diagram depicting a general configuration of an information processing apparatus according to an embodiment of the present invention.

An information processing apparatus 10 according to the embodiment of the present invention is a domestic game machine, a personal computer, or the like and includes a controlling section 11, a storage section 12, and an interface section 13 as depicted in FIG. 1. Further, the information processing apparatus 10 is connected for data communication to a display apparatus 14 and an operation device 15.

The controlling section 11 includes at least one processor such as a CPU and executes a program stored in the storage section 12 to execute various types of information processing. The controlling section 11 may include an arithmetic device such as a GPU specialized for image processing. It is to be noted that a particular example of a process to be executed by the controlling section 11 in the present embodiment is hereinafter described. The storage section 12 includes at least one memory device such as a RAM and stores a program to be executed by the controlling section 11 and data to be processed by the program. Further, the storage section 12 includes a buffer memory that temporarily stores a frame image hereinafter described.

The interface section 13 is an interface for data communication with the display apparatus 14 and the operation device 15. The information processing apparatus 10 is connected to the display apparatus 14 and the operation device 15 individually in wired or wireless connection through the interface section 13. In particular, the interface section 13 includes multimedia interface for transmitting a video signal supplied by the information processing apparatus 10 to the display apparatus 14. Especially, in the present embodiment, the interface section 13 includes an interface capable of transmitting a video signal in accordance with a standard supporting the variable refresh rate such as the HDMI. Further, the interface section 13 includes a data communication interface for receiving an operation signal indicative of contents of an operation input made by a user from the operation device 15. The interface section 13 may further include a communication interface for transmission and reception of data with some other computers through a communication network such as the Internet.

The display apparatus 14 is a domestic television receiver, a monitor apparatus for a personal computer, or the like and displays a video based on a video signal received from the information processing apparatus 10. Especially, in the present embodiment, the display apparatus 14 supports the variable refresh rate technology and updates a frame image to be displayed on a screen, at a timing that is determined according to a synchronizing signal included in a video signal supplied by the information processing apparatus 10. In other words, the display apparatus 14 can update a frame image to be displayed, not at a fixed refresh rate determined in advance but at a dynamically varying refresh rate.

The operation device 15 is a device for accepting an operation input made by the user of the information processing apparatus 10 and may be, for example, a controller for a domestic game machine, a keyboard, or a mouse. The operation device 15 includes operation members such as buttons and a touch pad for accepting an operation input made by the user and transmits an operation signal indicative of contents of the operation input made by the user to the operation members to the information processing apparatus 10.

Figure 2:
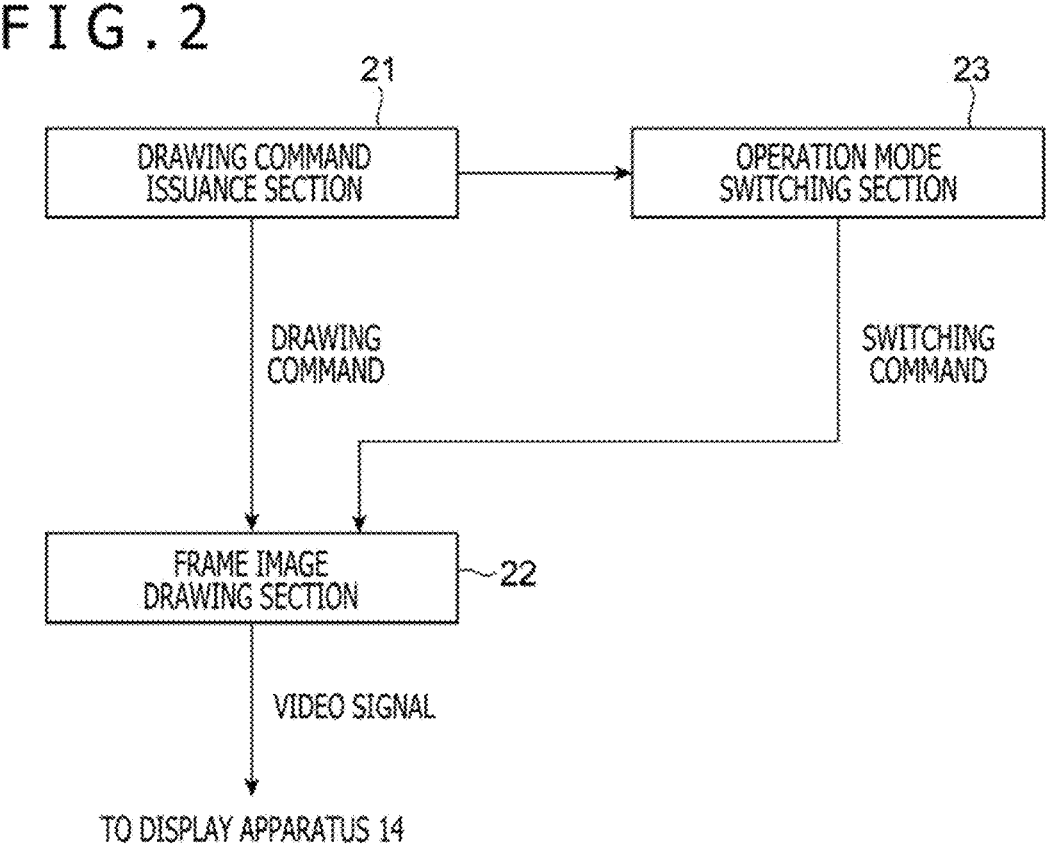
FIG. 2 is a functional block diagram depicting functions implemented by the information processing apparatus according to the embodiment of the present invention.

In the following, functions that are implemented by the information processing apparatus 10 in the present embodiment are described with reference to a functional block diagram of FIG. 2. As depicted in FIG. 2, the information processing apparatus 10 functionally includes a drawing command issuance section 21, a frame image drawing section 22, and an operation mode switching section 23. The functions are implemented by the controlling section 11 executing one or a plurality of programs stored in the storage section 12. The programs may be provided to the information processing apparatus 10 through a communication network such as the Internet or may be provided to the information processing apparatus 10 in a state of being stored in an information storage medium such as an optical disk.

The drawing command issuance section 21 determines contents of a frame image to be displayed on the screen of the display apparatus 14 (such a frame image is hereinafter referred to as a display frame image) and issues a drawing command for the determined contents to the frame image drawing section 22. The drawing command issuance section 21 is implemented by an application program such as a game program. As an example, in a case where a process of a game of the type in which a character is operated in a virtual space is to be executed, the drawing command issuance section 21 determines a position and a state of each of various objects to be disposed in the virtual space, a viewpoint position, and so forth and issues a drawing command to draw a situation of the virtual space.

The drawing command issuance section 21 successively executes a loop process to repeatedly issue such a drawing command for a display frame image. Consequently, the frame image displayed on the screen of the display apparatus 14 is sequentially updated and presented as a video to the user. Since the display apparatus 14 supports the variable refresh rate as described above, the drawing command issuance section 21 need not issue a drawing command at regular intervals and can issue a drawing command for a display frame image to be displayed next, suitably at a timing at which the frame image drawing section 22 ends drawing of a display frame image.

The frame image drawing section 22 draws a display frame image to be displayed on the screen of the display apparatus 14, in response to the drawing command received from the drawing command issuance section 21, and transmits a video signal including data regarding the drawn display frame image to the display apparatus 14. The frame image drawing section 22 may be implemented by a program independent of the program that implements the drawing command issuance section 21, such as, for example, a graphic library or a game engine.

The frame image drawing section 22 updates the display frame image in one of the operation modes of a variable frame rate and a fixed frame rate. Here, updating of the display frame image signifies that the frame image drawing section 22 starts transmission of a drawn display frame image to the display apparatus 14 to establish a state in which drawing of a next display frame image is possible.

In particular, in a case where the program that implements the drawing command issuance section 21 or the display apparatus connected does not support the variable refresh rate, the frame image drawing section 22 performs updating of the display frame image at a fixed frame rate. In this case, the frame image drawing section 22 transmits a display frame image drawn in accordance with a drawing command, to the display apparatus 14 at regular intervals at a frame rate determined in advance.

In contrast, in a case where the display apparatus 14 supporting the variable refresh rate is connected and the program that implements the drawing command issuance section 21 is a program supporting drawing at a variable frame rate, the frame image drawing section 22 updates the display frame image at the variable frame rate. In this case, the frame image drawing section 22 sequentially transmits, every time drawing of a display frame image comes to an end, the drawn display frame image to the display apparatus 14 without waiting for the passage of a predetermined time period.

In either operation mode, the drawing command issuance section 21 executes a process for issuing a drawing command for a next display frame image, at a timing at which the frame image drawing section 22 updates the display frame image. Consequently, in whichever one of the operation modes the frame image drawing section 22 is operating, the drawing command issuance section 21 can keep issuing a drawing command in a cycle adjusted to the timing at which the display frame image is updated.

Here, there may be a case in which the drawing command issuance section 21 causes the display apparatus 14 to display a moving image including a portion that is drawn already at the time when the frame image drawing section 22 itself performs, in real time, drawing of a display frame image, such as a moving image prepared in advance or a moving image provided from the outside of the information processing apparatus 10. In this manner, a moving image that is to be displayed on the display apparatus 14 and in which, at a timing at which the frame image drawing section 22 draws a display frame image, a frame image to be included in the display frame image is already drawn is hereinafter referred to as a drawn moving image.

In particular, the drawn moving image may include a moving image (stored moving image) that is encoded in advance and that is stored in advance in a storage device such as a hard disk drive or a solid state drive connected to the information processing apparatus 10. For example, in a case where a predetermined event occurs during execution of a game or in a like case, the drawing command issuance section 21 sometimes displays a moving image of a movie scene stored in the storage device. Further, the drawing command issuance section 21 sometimes displays a moving image representative of a hint or the like for the game being played by the user, in a partial region in the display screen simultaneously together with a screen image of the game.

Figure 3:
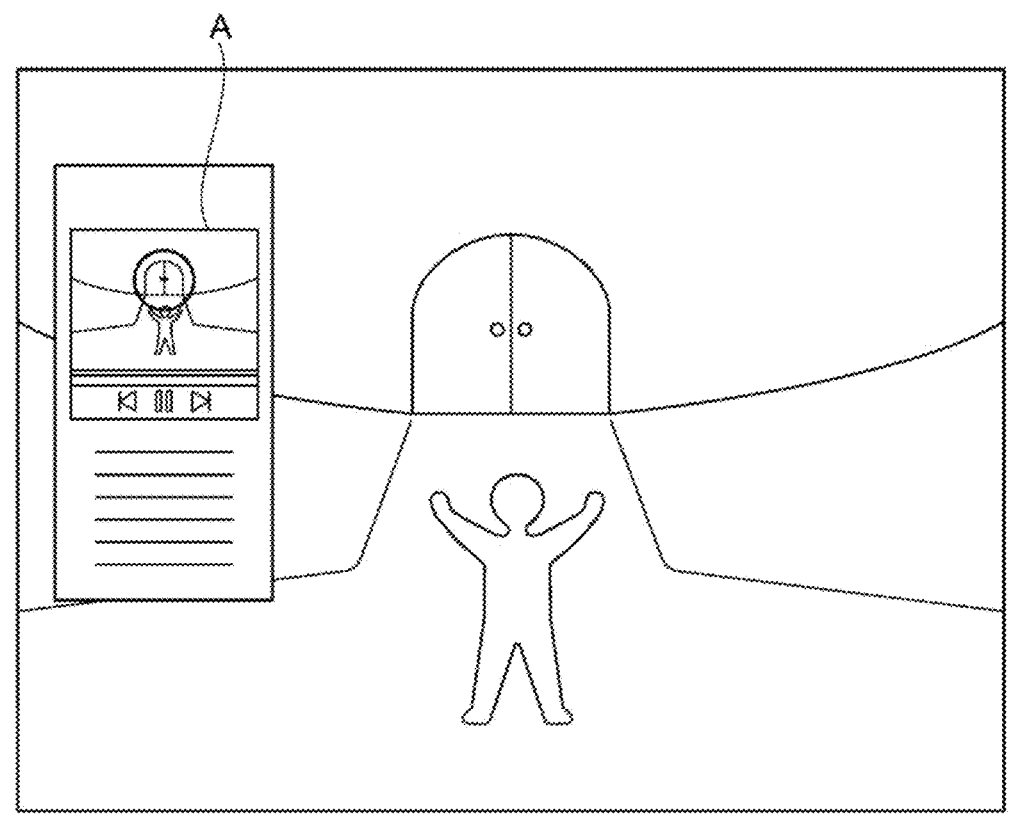
FIG. 3 is a view depicting an example of a display frame image to be displayed on a display apparatus.

FIG. 3 depicts an example of the display frame image displayed in the case where contents of a stored moving image are included in part of the screen image in this manner. In the example of FIG. 3, the contents of a stored moving image are included in a region A that occupies part of the entire display frame image displayed on the display apparatus 14. In this case, the frame image drawing section 22 draws, over the entire screen, the contents to be displayed in real time on the basis of the drawing command issued by the drawing command issuance section 21 and places a frame image constituting the stored moving image at a position of the region A, to thereby generate a display frame image.

Generally, a stored moving image is a moving image generated in advance at a fixed frame rate. Therefore, if a display frame image including contents of a stored moving image is drawn at a variable frame rate, there is the possibility that the timings at which frame images constituting the stored moving image are displayed may be displaced from those at the time of generation.

Further, the drawn moving image may include a moving image (delivered moving image) delivered to the information processing apparatus 10 through a communication network from a computer different from the information processing apparatus 10. For example, there is a case in which the information processing apparatus 10 receives, through the communication network, a moving image representing a game screen image that is being played by another player connected online and that is separate from the game screen image being played by the user itself of the information processing apparatus 10, and displays the moving image on the screen of the display apparatus 14. In this case, drawing and delivery by a computer of the delivery source and reception and displaying on the information processing apparatus 10 are executed in parallel.

Also in the case where delivery is performed in real time as described above, the information processing apparatus 10 sequentially receives a frame image of a delivered moving image drawn by the delivery source computer and places the received frame image into the display frame image. That is, in a case where the contents of the delivered moving image are to be displayed on the screen of the display apparatus 14, a frame image of the delivered moving image already drawn by the delivery source computer is included in the display frame image drawn by the frame image drawing section 22. Each frame image constituting the delivered moving image in this case has not necessarily been drawn at a timing synchronized with a timing at which the frame image drawing section 22 draws the display frame image. In particular, while the delivered moving image is a moving image drawn at a fixed frame rate or a variable frame rate by the delivery source computer, in either case, the moving image is delivered to the information processing apparatus 10 in an encoded state in a given format. Therefore, even if the delivered moving image is a moving image drawn at a variable frame rate by the delivery source computer, it is difficult for the information processing apparatus 10 to update the display frame image at a frame rate synchronized with the original frame rate.

As described above, in the case where a drawn moving image is to be included into a display target, there is the possibility that the contents of the drawn moving image may not appropriately be displayed in the operation mode of a variable frame rate in which a drawing command for a new display image is issued in response to an end of a drawing process. This is because the drawn moving image is a moving image generated in advance at a fixed frame rate or a moving image generated at a frame rate that is different from a time period required for drawing of a display frame image in the information processing apparatus 10.

Therefore, in the information processing apparatus 10 according to the present embodiment, the operation mode switching section 23 issues a switching command for switching the operation mode of the frame image drawing section 22 as occasion demands. The drawing command issuance section 21 and the operation mode switching section 23 may be implemented by the same program.

In particular, in a case where the drawing command issuance section 21 determines that contents of a drawn moving image are to be displayed, the operation mode switching section 23 issues an operation mode switching command for requesting for operation at a fixed frame rate, to the frame image drawing section 22. This switching command may be implemented by, for example, calling of an API provided by a program that implements the frame image drawing section 22.

Thereafter, the drawing command issuance section 21 regularly issues a drawing command for a screen image including the drawn moving image. In response to this, the frame image drawing section 22 updates the display frame image including the contents of the drawn moving image at a fixed frame rate and causes the updated display frame image to be displayed on the screen of the display apparatus 14. It is to be noted that, since, as described above, the drawing command issuance section 21 issues a next drawing command in response to a timing at which the frame image drawing section 22 updates the display frame image, the drawing command issuance section 21 can continuously execute a loop process for drawing command issuance irrespective of in whichever one of the operation modes the frame image drawing section 22 is operating.

Information for designating a value of the frame rate used after switching may be included in the switching command to switch to the fixed frame rate. In a case where such a switching command is accepted, the frame image drawing section 22 thereafter updates the display frame image at time intervals according to the designated value of the frame rate.

Further, the operation mode switching section 23 may issue a switching command for switching the operation mode from the fixed frame rate to a variable frame rate to the frame image drawing section 22 at a timing at which the drawing command issuance section 21 ends displaying of the drawn moving image. This makes it possible for the frame image drawing section 22 to restart updating of the display frame image at a variable frame rate.

It is to be noted that, when an operation mode switching command is accepted, the frame image drawing section 22 may not perform switching immediately to fully change the frame rate but may change the frame rate stepwise. For example, when a switching command to switch to a fixed frame rate with a designation of a value of a frame rate included is accepted, if the fixed frame rate after the switching is different from the last frame rate by a predetermined threshold value or more, the frame image drawing section 22 may cause the frame rate to change stepwise by a predetermined amount of change in such a manner as to gradually change to the designated value of the frame rate.

Figure 4:
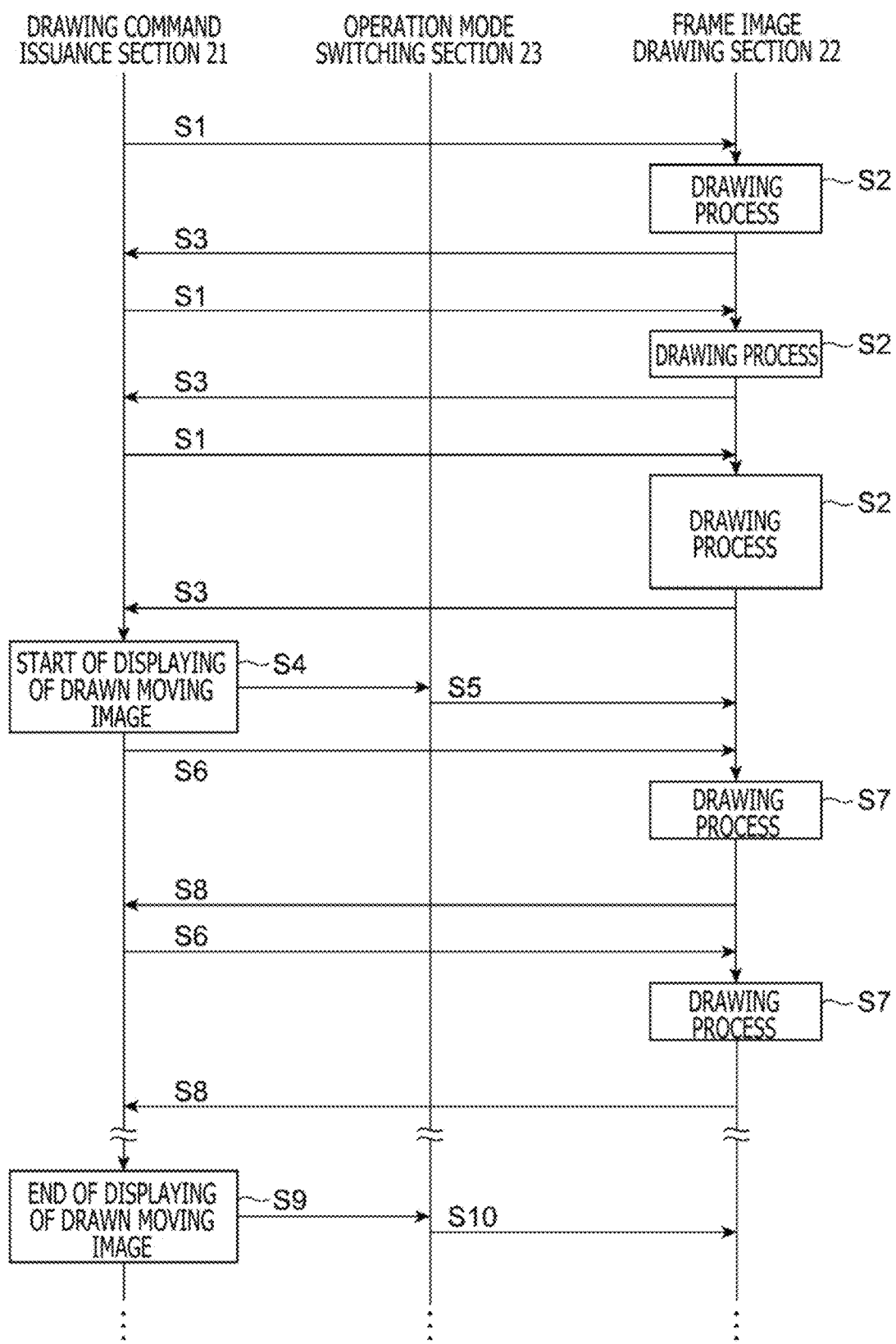
FIG. 4 is a sequence diagram depicting an example of a flow of processing that is executed by the information processing apparatus according to the embodiment of the present invention.

In the following, an example of a flow of processing to be executed by the information processing apparatus 10 according to the present embodiment is described with reference to a sequence diagram of FIG. 4.

First, execution of an application program for implementing the drawing command issuance section 21 is started in response to an operation input made to the operation device 15 by the user or the like. Thereafter, the drawing command issuance section 21 executes processing of the application program and, at the same time, issues a drawing command for every frame in order to display a result of the processing on the screen of the display apparatus 14 (S1).

The frame image drawing section 22 accepts the drawing command from the drawing command issuance section 21 and executes a drawing process of a frame image (S2). At this time, the frame image drawing section 22 updates the display frame image in an operation mode determined according to a type of the program, setting contents determined in advance, and so forth. Here, the frame image drawing section 22 updates the display frame image at a variable frame rate. Therefore, when drawing of the display frame image comes to an end, the frame image drawing section 22 immediately starts transmission of the drawn display frame image to the display apparatus 14 and notifies the drawing command issuance section 21 of completion of updating of the display frame image (S3). The drawing command issuance section 21 receives this notification and executes a process for issuing a drawing command for a next display frame image. Consequently, the frame rate dynamically changes according to the time period required for the frame image drawing section 22 to draw the display frame image. Within a period within which displaying of a drawn moving image is not performed, the updating process of the display frame image at a variable frame rate is repeatedly executed in accordance with such a cycle of S1 to S3 as described above.

Thereafter, it is assumed here that the drawing command issuance section 21 determines to display a drawn moving image on the screen of the display apparatus 14 in accordance with the progress of processing of the application program (S4). Receiving this determination, the operation mode switching section 23 issues a switching command to switch to a fixed frame rate to the frame image drawing section 22 (S5). The frame image drawing section 22 accepts the switching command and switches the operation mode of itself to the operation mode of a fixed frame rate.

After the switching to the operation mode of a fixed frame rate, an updating process of a display frame image similar to the cycle of S1 to S3 described above is executed repeatedly. In particular, the drawing command issuance section 21 issues a drawing command including the contents of the drawn moving image (S6), and the frame image drawing section 22 executes a drawing process of a display frame image in accordance with the drawing command (S7). At this time, a frame image constituting the drawn moving image is included in the display frame image. Then, the frame image drawing section 22 here does not start transmission of the display frame image immediately after drawing of the display frame image comes to an end, but transmits, after the passage of a time period determined according to the fixed frame rate, the drawn display frame image to the display apparatus 14 and notifies the drawing command issuance section 21 of completion of the updating of the display frame image (S8).

Further, it is assumed that the drawing command issuance section 21 thereafter determines to end the displaying of the drawn moving image (S9). Receiving this determination, the operation mode switching section 23 issues a switching command to switch to a variable frame rate to the frame image drawing section 22 (S10). The frame image drawing section 22 accepts the switching command and switches the operation mode of itself to an operation mode of a variable frame rate. Thereafter, the updating process of the display frame image at a variable frame rate is performed similarly as in the cycle of S1 to S3 described above.

Note that it is assumed in the description given above that all of the display contents included in the display frame image are determined by one application program. However, there is a case in which the information processing apparatus 10 executes a plurality of application programs at the same time and results of processing by the respective application programs are displayed on the screen of the display apparatus 14. For example, there is a case in which the information processing apparatus 10 executes a game program and displays a result of the execution on the entire screen of the display apparatus 14 while it displays, in an overlapping relation with the result, a processing result of another application program in a sub window at a portion of the screen. In this case, the plurality of programs individually issue a drawing command, and the frame image drawing section 22 accepts the plurality of drawing commands to draw one display frame image including the contents of the accepted commands.

Figure 5:
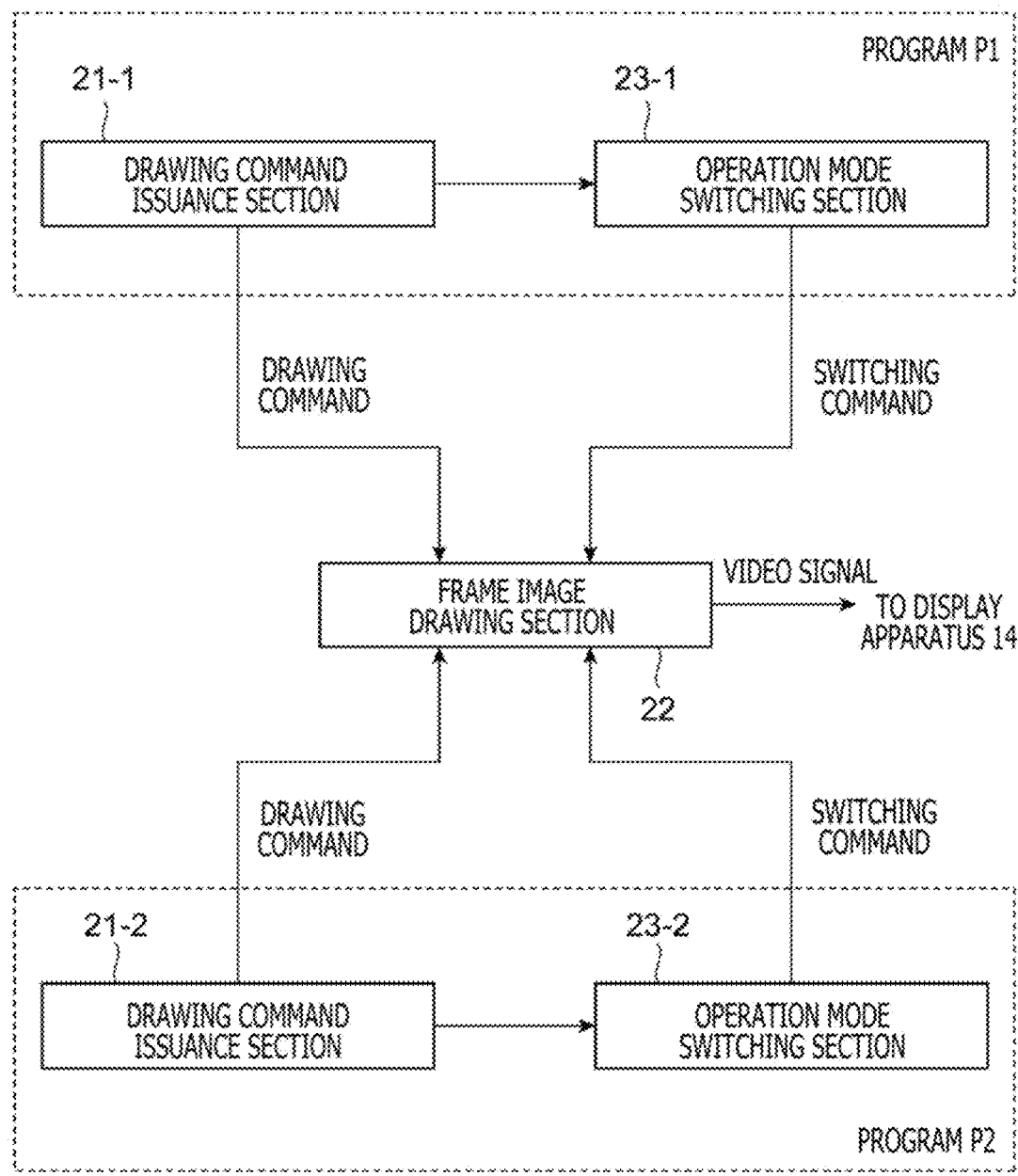
FIG. 5 is a functional block diagram depicting another example of functions that are implemented by the information processing apparatus according to the embodiment of the present invention.

FIG. 5 is a functional block diagram depicting an example of functions that are implemented by the information processing apparatus 10 in a case where two application programs are executed in parallel. In the example of FIG. 5, the information processing apparatus 10 executes a program P1 and another program P2 at the same time, and both of the two programs implement the functions of the drawing command issuance section 21 and the operation mode switching section 23. In particular, the program P1 implements functions of a drawing command issuance section 21-1 and an operation mode switching section 23-1, and the program P2 implements functions of a drawing command issuance section 21-2 and an operation mode switching section 23-2.

The drawing command issuance sections 21-1 and 21-2 issue drawing commands for images indicative of processing results of the respective programs to the frame image drawing section 22. Receiving the drawing commands, the frame image drawing section 22 draws one display frame image including the contents according to both of the drawing commands and transmits the drawn display frame image to the display apparatus 14.

Then, in this example, in a case where the drawing command issuance section 21-1 determines to include contents of a drawn moving image into the display contents, the operation mode switching section 23-1 issues a switching command to switch to a fixed frame rate to the frame image drawing section 22. Similarly, in a case where the drawing command issuance section 21-2 determines to include contents of a drawn moving image into the display contents, the operation mode switching section 23-2 issues a switching command to switch to a fixed frame rate to the frame image drawing section 22.

When a switching command to switch to a fixed frame rate is received from any of the programs, the frame image drawing section 22 switches the operation mode to an operation mode for updating the display frame image at a fixed frame rate. At this time, also the program that has not requested for switching to a fixed frame rate can continue issuance of a drawing command at an appropriate timing, irrespective of in which one of the operation modes the frame image drawing section 22 is operating, by issuing of a next drawing command according to a timing at which the frame image drawing section 22 updates the display frame image.

Further, in a case where the program that has issued a switching command to switch to a fixed frame rate issues a switching command to switch to a variable frame rate later, the frame image drawing section 22 performs switching to the operation mode of a variable frame rate. Note that it is assumed that, in a case where both of the two programs have issued a switching command to switch to a fixed frame rate, the frame image drawing section 22 continues operation at a fixed frame rate until both of the programs issue a switching command to switch to a variable frame rate. That is, it is assumed that, if any one of a plurality of programs executed in parallel requests for operation at a fixed frame rate, the frame image drawing section 22 updates the display frame image at a fixed frame rate, and that, only in a case in which none of the programs requests for operation at a fixed frame rate, the frame image drawing section 22 updates the display frame image at a variable frame rate. Consequently, in a case where a drawn moving image is to be displayed, whichever one of the programs requests for displaying of the drawn moving image, the display frame image including the contents of the drawn moving image can be updated at a fixed frame rate.

As described above, with the information processing apparatus 10 according to the present embodiment, in a case where displaying including contents of a drawn moving image for which displaying at a variable frame rate is not appropriate is to be performed, updating of the display frame image can be performed at a fixed frame rate, and a disorder of the displaying involved in updating at a variable frame rate can be reduced.

It is to be noted that the embodiment of the present invention is not restricted to that described above. For example, although the foregoing description is directed to an example of a case in which one or two programs issue a drawing command, this is not restrictive. Also in a case in which three or more programs operate in parallel, by operation of the frame image drawing section 22 in accordance with drawing commands and switching commands from the respective programs, the display frame image can be updated in an appropriate operation mode, i.e., a fixed frame rate or a variable frame rate, according to the situation.

Further, the drawn moving image is not restricted to the example described above, and, in a case where various moving images that are desirable to be displayed at a fixed frame rate rather than a variable frame rate are to be displayed, the operation mode switching section 23 may perform switching of the operation mode. For example, the drawn moving image may include a moving image that has been drawn in the past by the frame image drawing section 22 itself and that has been stored into a storage device for reproduction in the future.

REFERENCE SIGNS LIST

10: Information processing apparatus
11: Controlling section
12: Storage section
13: Interface section
14: Display apparatus
15: Operation device
21: Drawing command issuance section
22: Frame image drawing section
23: Operation mode switching section

The invention claimed is:

1. An information processing apparatus configured to draw a display frame image to be displayed on a display and transmit the drawn display frame image to the display in one of operation modes of a fixed frame rate and a variable frame rate, comprising:
  processing circuitry configured to
    draw the display frame image and transmit the drawn display frame image to the display in the operation mode of the variable frame rate;
    switch, in a case where a moving image including contents that are drawn already when the drawing of the display frame image is performed is to be displayed on the display, the operation mode to the fixed frame rate; and
    change a frame rate stepwise when switching between the variable frame rate and the fixed frame rate.

2. The information processing apparatus according to claim 1,
  wherein the processing circuitry is further configured to when the displaying of the moving image ends, switch the operation mode to the variable frame rate.

3. The information processing apparatus according to claim 1, wherein the processing circuitry is further configured to
  when switching the operation mode to the fixed frame rate, also designate a value of a frame rate, and
  transmit the display frame image to the display at time intervals according to the designated value of the frame rate.

4. The information processing apparatus according to claim 1, wherein the processing circuitry is further configured to execute a plurality of programs at the same time,
wherein each of the plurality of programs functions to switch the operation mode to the fixed frame rate in a case where the program itself is to cause the moving image to be displayed on the display, and
transmit the display frame image to the display in the fixed frame rate in a case where at least one of the plurality of programs requests for switching to the fixed frame rate.

5. The information processing apparatus according to claim 1, wherein the moving image includes a moving image that is drawn in advance and that is stored in a memory connected to the information processing apparatus.

6. The information processing apparatus according to claim 1, wherein the moving image includes a moving image that is delivered from another computer different from the information processing apparatus.

7. An information processing method for drawing a display frame image to be displayed on a display and transmitting the drawn display frame image to the display in one of operation modes of a fixed frame rate and a variable frame rate, comprising:

drawing the display frame image and transmitting the drawn display frame image to the display in the operation mode of the variable frame rate;
switching, in a case where a moving image including contents that are drawn already when the drawing of the display frame image is performed is to be displayed on the display, the operation mode so as to transmit the display frame image to the display at the fixed frame rate; and
changing a frame rate stepwise when switching between the variable frame rate and the fixed frame rate.

8. A non-transitory computer-readable medium storing computer-readable instructions thereon for causing a computer configured to draw a display frame image to be displayed on a display and transmit the drawn display frame image to the display in one of operation modes of a fixed frame rate and a variable frame rate to execute operations comprising:

drawing the display frame image and transmitting the drawn display frame image to the display in the operation mode of the variable frame rate;
switching, in a case where a moving image including contents that are drawn already when the drawing of the display frame image is performed is to be displayed on the display, the operation mode so as to transmit the display frame image to the display at the fixed frame rate; and
changing a frame rate stepwise when switching between the variable frame rate and the fixed frame rate.

9. The information processing apparatus according to claim 1, wherein the processing circuitry is further configured to change the frame rate stepwise by a predetermined amount when a difference between a current frame rate and a target frame rate exceeds a predetermined threshold value.

10. The information processing apparatus according to claim 5, wherein the moving image is displayed in response to a predetermined event occurring during execution of a game.

11. The information processing apparatus according to claim 1, wherein the moving image is displayed in a partial region of the display simultaneously with other content.

12. The information processing apparatus according to claim 1, wherein the processing circuitry is further configured to place a frame image of the moving image into the display frame image at a designated position.

13. The information processing apparatus according to claim 6, wherein the moving image delivered from another computer represents a game screen image being played by another player connected online.

14. The information processing apparatus according to claim 1, wherein the display is configured to support a variable refresh rate technology and update a frame image to be displayed on a screen at a timing determined according to a synchronizing signal included in a video signal supplied by the information processing apparatus.

15. The method of claim 7, further comprising:

changing the frame rate stepwise by a predetermined amount when a difference between a current frame rate and a target frame rate exceeds a predetermined threshold value.

16. The method of claim 7, wherein the moving image is displayed in a partial region of the display simultaneously with other content.

17. The method of claim 7, further comprising:

placing a frame image of the moving image into the display frame image at a designated position.

18. The method of claim 7, wherein the display is configured to support a variable refresh rate technology and update a frame image to be displayed at a timing determined according to a synchronizing signal included in a video signal supplied by an information processing apparatus.

* * * * *